United States Patent [19]
Lobach

[11] 3,908,380
[45] Sept. 30, 1975

[54] GEOTHERMAL ENERGY TURBINE AND WELL SYSTEM

[75] Inventor: James L. Lobach, Denver, Colo.

[73] Assignee: Sperry Rand Corporation, New York, N.Y.

[22] Filed: July 15, 1974

[21] Appl. No.: 488,331

[52] U.S. Cl. .................. 60/641; 417/379; 417/405
[51] Int. Cl.² ..................... F03G 7/00; F01K 23/00
[58] Field of Search ...... 60/641, 398; 415/199, 503, 415/655

[56] References Cited
UNITED STATES PATENTS

| | | | |
|---|---|---|---|
| 2,591,488 | 4/1952 | Yost .............................. | 415/199 X |
| 2,870,717 | 1/1959 | Dube et al. ...................... | 60/398 X |
| 3,695,367 | 10/1972 | Catterfield et al. ............. | 415/503 X |
| 3,709,630 | 1/1973 | Pohl et al. ........................ | 415/199 |
| 3,757,516 | 9/1973 | McCabe .......................... | 165/45 X |
| 3,822,554 | 7/1974 | Kelly .................................. | 60/655 |
| 3,857,244 | 12/1974 | Faucette ............................ | 60/641 |

Primary Examiner—Martin P. Schwadron
Assistant Examiner—H. Burks, Sr.
Attorney, Agent, or Firm—Howard P. Terry

[57] ABSTRACT

A geothermal energy transfer and utilization system makes use of thermal energy stored in hot solute-bearing well water to generate super-heated steam from an injected flow of clean water; the super-heated steam is then used for operating a novel turbine for driving a hot water pump at the well bottom for pumping the hot solute-bearing water at high pressure and in liquid state to the earth's surface, where transfer of its heat content to a closed-loop boiler-turbine-alternator combination is effected for the generation of electrical or other power. Clean water is regenerated by surface-located equipment for re-injection into the deep well and the residual concentrated solute-bearing water is pumped back into the earth. The novel pump driving turbine features a compact and efficient steam turbine configuration adapted for use in the hostile environment of the deep hot-water well. Super-heated steam passes downwardly to impact turbine blades at the periphery of the turbine wheel. A further feature permits the expanding steam then to reverse its sense of flow in a compact arrangement returning the steam along the axis of the turbine wheel and then to the earth's surface for further energy recovery.

13 Claims, 16 Drawing Figures

GEOTHERMAL ENERGY TURBINE AND WELL SYSTEM

CROSS REFERENCE TO RELATED CASES

The following applications employ the same drawings and description of the preferred embodiments as are used in the present application, claiming different features of the apparatus disclosed therein and assigned to Sperry Rand Corporation:

H. B. Matthews, Ser. No. 487,405, filed July 10, 1974 for "Improved Geothermal Energy Control System and Method,"

H. B. Matthews, K. E. Nichols, Ser. No. 487,429, filed July 10, 1974 for "Geothermal Energy System and Control Apparatus,"

R. Govindarajan, J. L. Lobach, K. E. Nichols, Ser. No. 488,333, filed July 15, 1974 for "Geothermal Energy Pump Thrust Balance Apparatus."

BACKGROUND OF THE INVENTION

1. Field of the Invention

The invention relates generally to efficient and compact means for the generation of electrical power utilizing energy from geothermal sources and, more particularly, relates to arrangements including efficient super-heated steam generation and pumping equipment for application in deep hot water wells for transfer of thermal energy to the earth's surface.

2. Description of the Prior Art

While geothermal energy sources have been exploited for the generation of power to a limited extent, generally known prior art systems operate at low efficiency and have serious disadvantages. In the few installations in which dry steam is supplied by wells at the earth's surface, the steam may be fed, after removal of solid matter, from the well head directly to a turbine. On the other hand, most geothermal wells are characterized by yields at the earth's surface of a mixture of steam and hot water with corrosive solutes, so that the water must be separated from the steam before the latter is used in a turbine.

In both of these kinds of installations, low pressure steam normally results, requiring special turbines and yielding relatively inefficient power generation as compared to generation of power using normally operated fossil fuel-powered or nuclear-powered electrical generation equipment. In only a few instances do geothermal wells actually produce truly super-heated steam with minor amounts of undesired gases and with substantially no liquid water.

The presence of significant amounts of liquid water in wells used with prior art geothermal systems presents other problems in addition to the separation problem. If the water is only moderately hot, extracting thermal energy from it may be expensive or, at least, inefficient. Whether or not the heat is used, the water must be handled. The water usually bears considerable concentrations of silica and of alkali salts, including chloride, sulfate, carbonate, borate, and the like ions, all of which dissolved salts present precipitation problems at the point at which any part of the water may abruptly flash into steam. If the alkaline water is allowed to escape at the installation, severe chemical and thermal pollution of streams or rivers results. Finally, there is some evidence that the removal of large amounts of water from geothermal reservoirs may lead to undersirable land subsidence in the vicinity of thermal well installations.

A major advance in the art of extraction and use of geothermal energy is reflected in the H. B. Matthews U.S. Pat. application Ser. No. 300,058 for a "Geothermal Energy System and Method," filed Oct. 24, 1972 issued July 23, 1974 as U.S. Pat. No. 3,824,793, and assigned to the Sperry Rand Corporation. The prior Matthews invention provides means for efficient power generation employing energy derived from subterranean geothermal sources through the generation of dry super-heated steam and the consequent operation of sub-surface equipment for pumping extremely hot well water at high pressures to the earth's surface. Clean water is injected at a first or surface station into the deep well where thermal energy stored in hot solute-bearing deep well water is used at a second or deep well station to generate super-heated steam from the clean water. The resultant dry super-heated steam is used at the well bottom for operating a turbine-heated pump for pumping the hot solutebearing well water to the first station at the earth's surface, the water being pumped at all times and locations in the system at pressures which prevent flash steam formation. The highly energetic water is used at the surface or first station in a binary fluid ststem so that its thermal energy is transferred to a closed-loop surface-located boiler-turbine system for driving an electrical power alternator. Cooled, clean water is regenerated by the surface system for re-injection into the well for operation of the steam turbine therein. Undesired solutes are pumped back into the earth via a separate well in the form of a concentrated brine.

In contrast with the relatively poor performance of other prior art systems, the prior Matthews invention is characterized by high efficiency as well as by many other advantageous features. It is not limited to use with the rare dry steam sources, and it is devoid of the water and steam separation problems attached to the more usual prior art systems used with mixed steam and hot water supply wells. Since the novel power system operates with dry, highly super-heated steam, existing efficient heat transfer elements and efficient high pressure turbines may readily be employed at the surface station. The very large calorific content of high temperature water subjected to high pressure is efficiently employed. Since high pressure liquid is used as the thermal transfer medium, undersired flash steam formation is prevented, along with its undesired attendant deposition of dissolved materials. Because the dissolved salts are efficiently pumped back deep into the earth as remotely as need be from the geothermal source, surface polution effects are avoided and there is relatively little risk of land sinkage in the vicinity of the geothermal little risk of land sinkage in the vicinity of the geothermal source.

SUMMARY OF THE INVENTION

The present invention is an improvement in deep well geothermal system of the kind described in the aforementioned patent application Ser. No. 300,058, now U.S. Pat. No. 3,824,793; according to the present invention, there is provided an efficient means for the generation of electrical power at the earth's surface, using energy abstracted from the geothermal source. The apparatus includes means for the efficient generation of super-heated steam and a novel steam-driven pumping system at the well bottom operated for transfer of hot water to the earth's surface where its energy content is beneficially used for power generation.

The invention is more particularly converned with features of a compact and efficient steam turbine system adapted for use in the hostile environment of the deep hot-water well. In the apparatus, super-heated steam passes downwardly to impact turbine blades at the periphery of the turbine wheel. A further feature permits the expanding steam then to reverse its sense of flow in a compact arrangement returning the steam along the axis of the turbine wheel and then to the earth's surface for further energy recovery. The arrangement for routing the exhaust steam through the turbine wheels avoids restriction of the path of the hot pumped well water is the limited space inside the conventional well casing.

DESCRIPTION OF THE PREFERRED EMBODIMENTS

Figure 1:
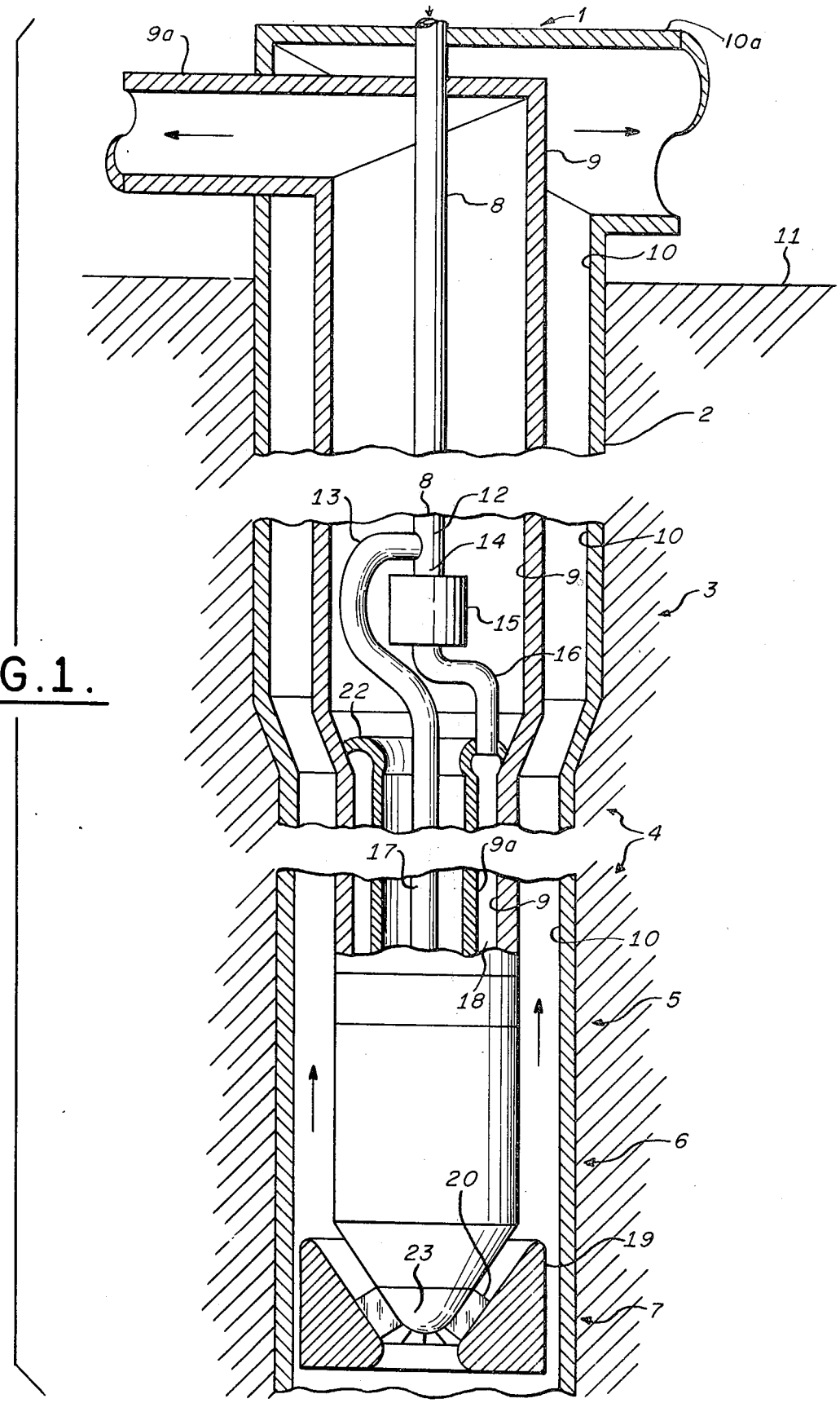
FIG. 1 is an elevation view, mostly in cross section, of the deep well geothermal pumping apparatus.

FIG. 1 illustrates the general structure and characteristics of that portion of the novel geothermal energy extraction system which is immersed in a deep well extending into strata far below the surface of the earth, preferably being located at a depth below the surface such that a copious supply of extremely hot water under high pressure is naturally available, the active pumping structure being located adjacent the hot water source and within a generally conventional well casing pipe 10. The configuration in FIG. 1 is seen to include a well head section 1 located above the earth's surface 11 and a main well section 2 extending downward from well head section 1 and below the earth's surface 11. At the subterranean source of hot, high pressure water, the main well section 2 joins a steam generator input section 3. The steam generator section 4, the steam turbine section 5, a power plant rotary bearing section 6, and a hot water pumping section 7 follow in close cooperative succession at increasing depths.

Extending downward from the well head section 1 at the earth's surface 11, the well casing pipe 10 surrounds in preferably concentric relation an innermost stainless steel or other high quality alloy steel pipe or conduit 8 for supplying a flow of relatively cool and relatively pure water at the bottom of the well for purposes yet to be explained. A second relatively large pipe or conduit 9 of similar quality and surrounding pipe 8 is also provided within well casing 10, extending from well head 1 to the energy conversion and pumping system at the bottom of the well and permitting turbine exhaust stem to flow to the surface of the earth, as will be described.

It will be seen from FIG. 1 that relatively clean and cold water is pumped down the inner pipe 8 from the surface 11 station to the region of the pipe tee 12. At tee 12, the downward flowing water is divided between two branch paths. As will be described, a first branch path feeds clean lubricating water through pipes 13 and 17 for lubricating a system of bearings within the system bearing section 6. The second branch path feeds clean water through pressure regulator system 15 and via distribution pipe or pipes 16 to the input manifold 22 of a steam generator 18 formed between the generally concentric walls of alloy pipes 9 and 9a. Accordingly, high pressure steam is generated and delivered to a steam turbine located within turbine section 5.

The function of the turbine located at 5 and supported on bearings located within bearing section 6 is to drive a hot water pump located at section 7. Hot, high pressure water is thus impelled upward by the rotating pump vanes 20 between the rotating conical end 23 of the pump and an associated rotating or stationary shroud 19; the hot water is pumped upward at high velocity in the annular conduit between pipes 9 and 10, thus permitting use of the thermal energy it contains at the earth's surface, as will be described. More important, the hot water is pumped upward to the earth's surface 11 at a pressure preventing it from flashing into and thus undesirably depositing dissolved salts at the point of flashing.

Accordingly, it is seen that the extremely hot, high-pressure well water is pumped upward, flowing in the annular region defined by alloy pipes 9 andd 10. Heat supplied by the hot water readily converts the clean water flowing into manifold 22 of the steam generator 18 into highly energetic, dry, super-heated steam. The clean water, before flowing through tee junction 12 and pressure regulator 15, is at a very high pressure due to its hydrostatic head and usually also to pressure added by a surface pump yet to be discussed, so that it may not flash into steam. The pressure regulator system 15 controls the pressure of the clean water flowing therethrough so that it may be vaporized and superheated in the volume 18 of the steam generator. The highly energetic steam drives the steam turbine and is redirected to flow upward to the surface 11 after expansion as relatively cool steam flowing within the annular conduit defined between alloy pipes 8 and 9. Thermal energy is recovered, as will be discussed, at the earth's surface 11 primarily from the hot, high pressure water, but may also be retrieved from the turbine exhaust steam.

Figure 2:
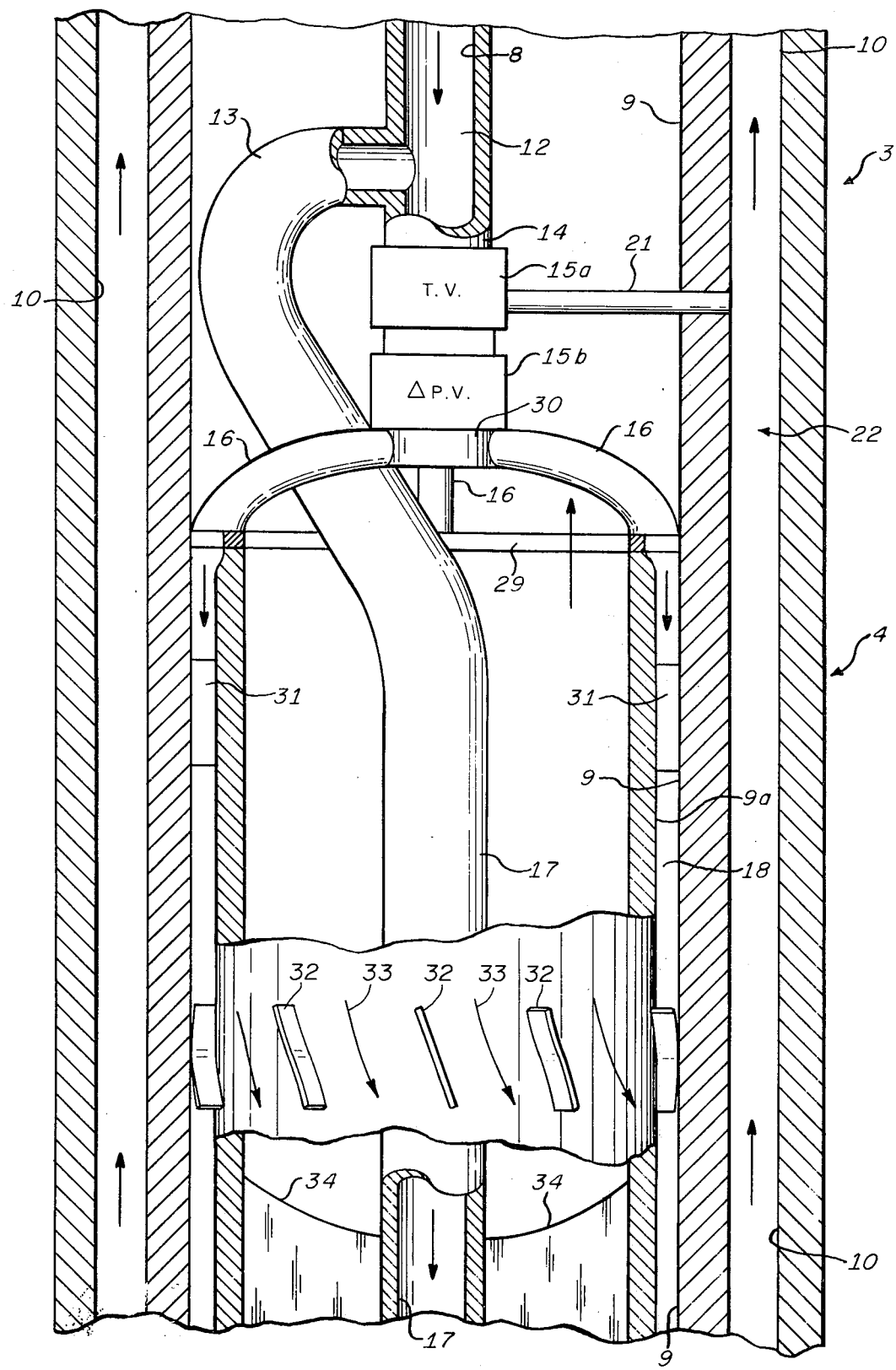
FIG. 2 is a detailed elevation view in cross section of a portion of the apparatus of FIG. 1.

Referring now to FIG. 2, certain details of a preferred form of the steam generator input section 3 and of the steam generator section 4 are illustrated. The general configuration is seen to be similar to that described in connection with FIG. 1. However, in FIG. 2, the tee junction 12 is used to feed two pressure control or regulator devices, a pressure threshold valve 15a in series with which is a differential pressure valve 15b. Both valves may be generally conventional, or may be modified as will be further discussed in connection with FIG. 16. Threshold valve 15a depends for operation upon sampling the pressure of the rising hot water stream between pipes 9 and 10, and the connecting hollow tube 21 is therefore provided for this purpose. Also, the configuration of FIG. 2 additionally illustrates a symmetric input system for the steam generator 118. For this purpose, an array of radially directed distribution pipes 16 is supplied for conducting the pressure regulated water output of differential pressure valve 15b through apertures in steam generator end plate 29 into the interior of generator volume 18. In this manner, clean water is symmetrically distributed to the annular steam generator 18 where is symmetrically distributed to the annular steam generator 18 where a fraction of the intense heat content passes from the pumped hot water through the wall of pipe 9 for producing the super-heated, dry steam.

The alloy pipes 9, 9a are spaced apart and are supported in fixed relation by arrays of radial spacers, such as the representative spacers 31, 31. The spacers 31, 31 may be aligned vertically and it is understood that several such arrays of spacers will preferably be used at intervals along the steam generator walls. In a preferred form of the spacers, they are shaped so that they perform an added function. As noted in the foregoing, fresh water supplied by manifold 22 is converted to super-heated steam as it travels downward in the steam generator annulus 18. In certain applications, it is found that an undersirable proportion of water drops fall through the steam generator volume 18 without being fully vaporized. Since such water drops are more dense that the dry steam, they travel downward much faster than the already vaporized portion of the flow and therefore tend to stay generally at the center of the flowing stream, not impacting the heated surface of pipe 9 where heat transfer is high. In the steam generator 18, there is also an additional complication in that the two-phase stream is flowing downward in an annulus and the inside surface of that annulus (provided by alloy pipe 9a) tends to absorb heat rather than contributing thermal energy to the steam generation process. The heat absorption mechanism is connected with the fact that the rising fluid within pipe 9a is relatively cool turbine exhaust steam. To overcome this undersired result, arrays of spacers such as 32, 32, 32 may be employed; the spacers 32 are no longer vertical, but are shaped and are oriented at finite angles with respect to the vertical. It is understood that several such arrays of spacers 32 will normally be used at intervals along the surface 9a. While the character of the shaping and the average skew angle will depend upon general design considerations, the curbed spacers are arranged to swirl the down-flowing dual-phaase fluid into generally helical paths, as illustrated by arrow 33. In this manner, the action of centrifugal force tends to force both the water drops and the already converted steam toward the heat source represented by the contiguous surface of pipe and away from the heat sink represented by the contiguous surface of the cooler pipe 9a. The advantageous results are that the previously converted steam is further heated and that any water drops are converted to steam also further heated as it passes down the steam generator volume 18 toward the steam turbine.

It will be appreciated from FIG. 1 that a severe problem to be solved in devising practical forms of the invention lies in creating a configuration which is compact, as well as efficient, especially in view of the consideration that the operating structure is preferably to be inserted into a well casing of standard size. Compactness of the structure, as well as efficiency of operation are therefore features of the apparatus of FIGS. 3 through 6, which apparatus is found within the turbine structure section 5 of FIG. 1.

Figure 3:
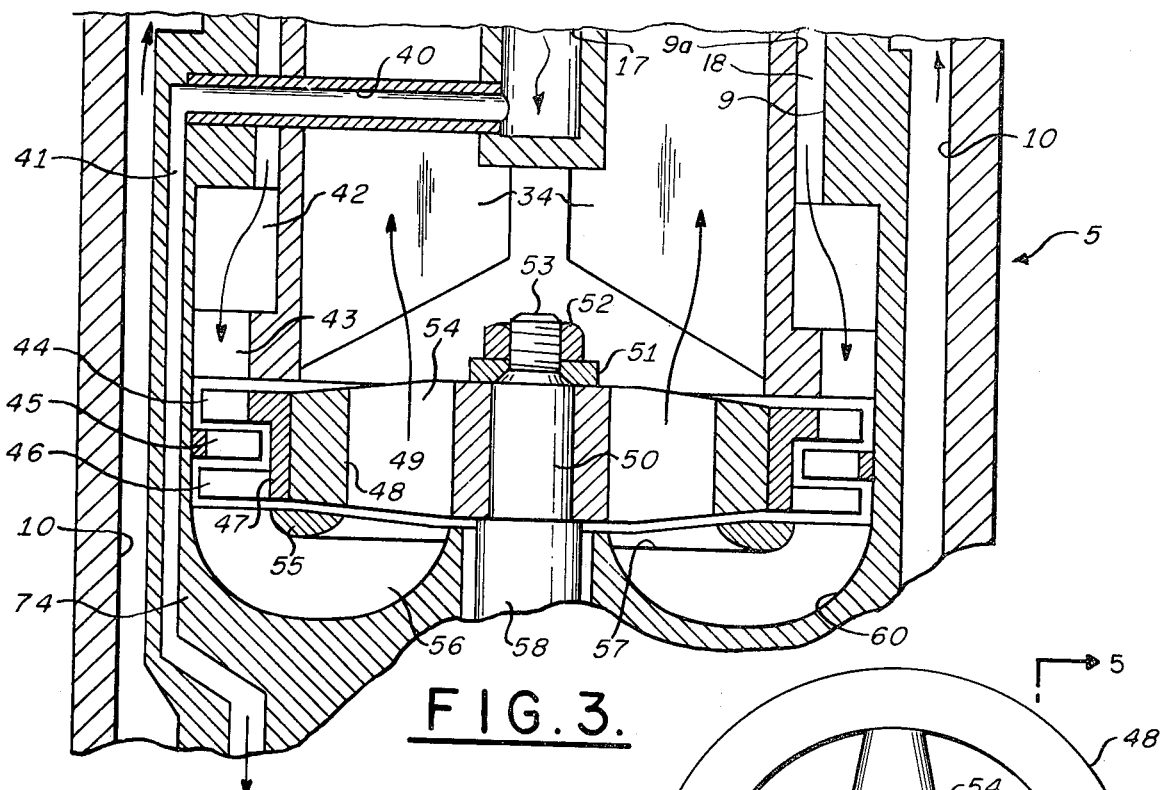
FIG. 3 is a detailed elevation view in cross section of the portion of the apparatus of FIG. 1 including the novel pump-driving steam turbine.

Referring particularly to FIG. 3, it is seen that the conduits of FIG. 2 extend into the steam turbine section 5. For example, the pumped hot water passage is located between pipes 9 and 10, while opposed surfaces of pipes 9 and 9a define the steam output passage of the steam generator. Between pipes 9a and 17 is the passage for upward flowing exhaust steam from the turbine. The pipe 17 is effectively extended to permit downward flow of clean water into and past the steam turbine section 5 via the channels 40 and 41. It is seen that a series of radial spaced vanes 34 welded between pipes 9a and 17 provides a supporting function; within the rising exhaust steam chamber, they additionally tend to redirect the exhaust steam so that it flows in a vertical direction without any substantial rotational motion.

For operating the steam turbine of FIG. 3, the steam from the steam generator 18 between pipes 9 and 9a is injected into an annular manifold 42, from whence it flows into an array of steam injection nozzles at 43 of generally conventional design. The nozzles 59 are shown in more detail at 43 in the developed view of FIG. 6 and are employed in the conventional manner to direct the high velocity steam against the blades of the turbine stages.

Single or multiple stage turbine blade systems of various known types may be employed in the system. However, for purposes of illustration, a multiple stage arrangement is presented, first and second stages being provided by respective pluralities 44 and 46 of vanes which pend in circular arrays from a circular base ring 47. The rotor arrays of vanes 44 and 46 cooperate with an intermediately located conventional array 45 of stator vanes affixed to the body block 74 common to the turbine section 5 and bearing section 6. The ring 47 bearing the vane arrays 44 and 46 is affixed in a conventional manner to a wheel rim 48. Rim 48 is part of a wheel additionally provided with a set of spokes 54 and hub 49. Hub 49, when the rotor system is rotating, causes shaft portions 50 and 58 to rotate, the hub 49 being securely fastened on shaft portion 50 by washer 51 and nut 52 secured on the threaded extension 53 of shaft portion 50.

A feature of the invention permitting compactness of design in concerned with the disposal of expanded steam which has yielded useful energy to the turbine rotor; the feature solves the particular problem of redirecting the exhaust steam without the requirement of space consuming elements. For this purpose, the turbine body block 74 contains an annular smoothly curved toroidal passageway 56 which redirects steam issuing from the rotary vane array 46 radially inward towards shaft portion 58, at the same time altering its direction so that the steam is caused to flow upwardly. The annular passageway 56 is defined by a suitably curved surface 60 cast within the body block 74 and by the surface of the opposed annular ring or guide 55. Ring guide 55 may be supported by an array or radially extending vanes 57 which, in addition to supporting the ring guide annulus 55 with respect to turbine body block 74, also tend to redirect the exhaust steam so that its velocity is primarily vertical, rotational components of motion being reduced in amplitude. Accordingly, it is seen that there is formed a smooth-sided torodial steam expanding passageway directing the steam after it exists the annular vane array 46 until it passes again through the turbine wheel.

Figure 5:
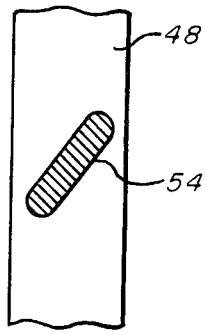
FIG. 5 is a detailed cross section view taken along the line 5—5 of FIG. 4.
Figure 4:
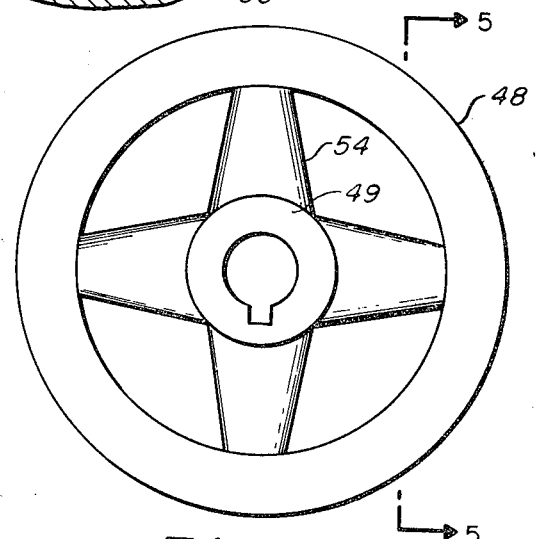
FIG. 4 is a plan view of a novel element of the FIG. 3 apparatus.
Figure 6:
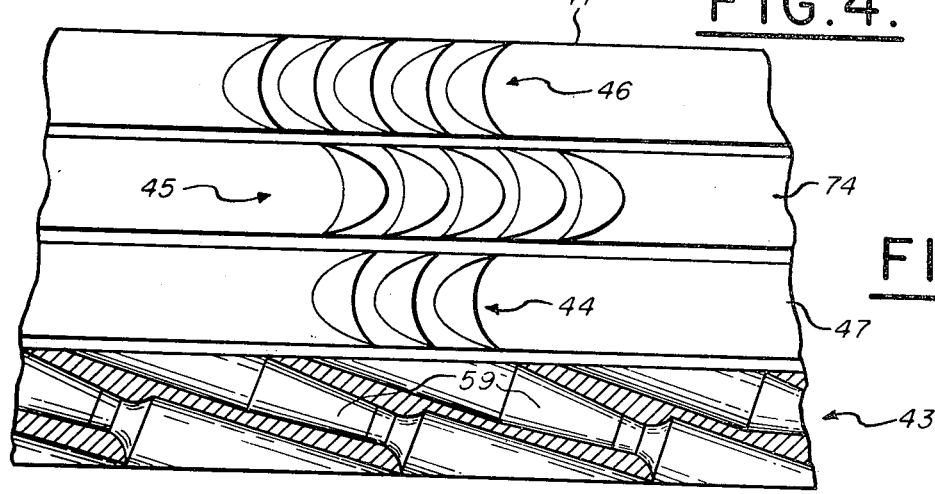
FIG. 6 is a developed drawing partly in cross section of a portion of the FIG. 3 apparatus.

The passage of steam through the latter is particularly facilitated by arranging the spokes 54 of the turbine wheel as illustrated particularly in FIGS. 4 and 5 so that the steam passes through the wheel, in essence, as if the spokes 54 were not present. The spokes 54 are individually tilted with respect to the direction of the rotation of rim 48 so that their effect at the selected operating rotational speed of the rotor is entirely neutral. In fact, spokes 54 are shaped and are provided with an angle of incidence with respect to the direction of steam flow so that they desirably neither add energy nor subtract energy from the upward flowing steam. Further, steam passages outside of the periphery of the rotating element of the steam turbine are not required and the resultant blocking of the flow of the pumped hot well water is avoided. As previously noted, it will be apparent to those skilled in the art that alternative features of known steam turbines may be employed within the scope of the invention. By way of further example, a double-stage re-entry turbine may be employed in which the steam is passed downward through one set of nozzles of a turbine having a single array of blades and is then reversed to flow upward through a second set of nozzles and the same turbine blades, the used steam again being exhausted in the general direction indicated in FIG. 3.

Figure 7:
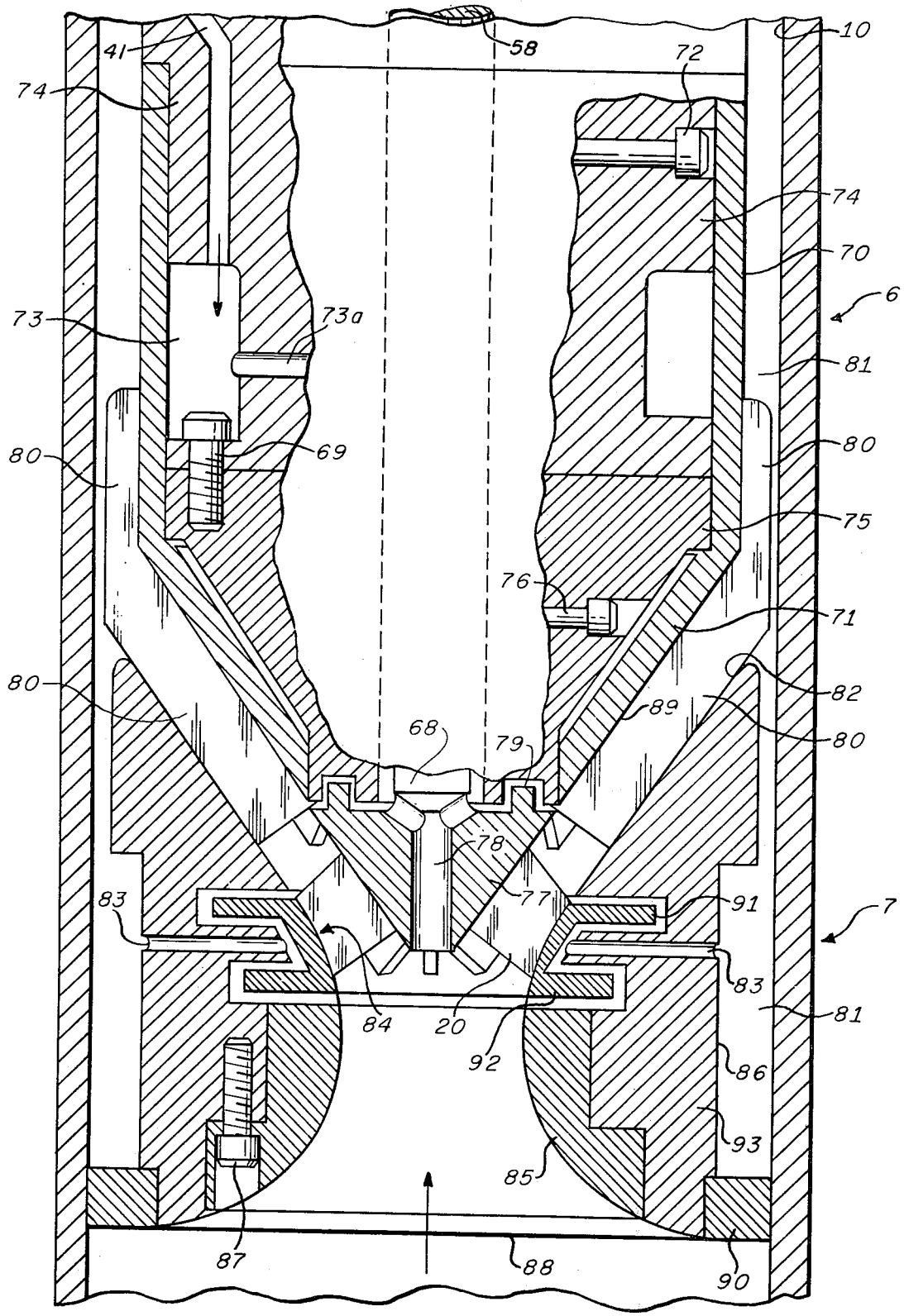
FIG. 7 is a detailed elevation view in cross section of the lower or hot water pump portion of the apparatus of FIG. 1.

FIG. 7 illustrates particularly the relations of elements of the bearing support system 6 and of the hot water pump section 7. With reference to FIG. 3, it is seen that there extends into the apparatus of FIG. 7 the well casing 10 and the bearing or body support block 74 from which is supported by bolts such as bolt 69 a generally conical casting 75 supporting, in turn, the pump apparatus, as will be further described. The castings of blocks 74 and 75 perform several primary functions, including providing a casing for containing the bearing system cooperating with and surrounding the shaft by means of which the steam turbine directly drives the hot water pump. However, for the purpose of providing clarity in the drawings, the bearing system will be discussed separately, especially in connection with FIG. 9. With reference to that discussion, it will be seen that clean lubricating water is supplied through body block 74 via passage 41, annular manifold 73 and the passage or passages 73a to the bearing system. Further, it will be seen that fasteners such as 72 and 76 position certain elements of the bearings relative to casting blocks 74 and 75.

A hardened case in provided to integrate and protect blocks 74, 75 from impact and corrosion and takes the form of a circular element having a hollow cylindrical portion 70 and a truncated hollow conical shell section 71 extending downward in concentric relation with the conical end portion of block 75. The pump end of shaft portion 68 projects beyond the generally co-planar ends of conical shell section 71 and conical block 75 for supporting conical end rotor 77 whose conical sides are, in effect, extension of the conical surface 89 of conical shell element 71. It will be seen that the nose cone rotor 77 supports other rotary elements of the pump, including a plurality of pumping vanes, such as vane 20, a rotatable section 84 of the pump shroud.

Figure 8:
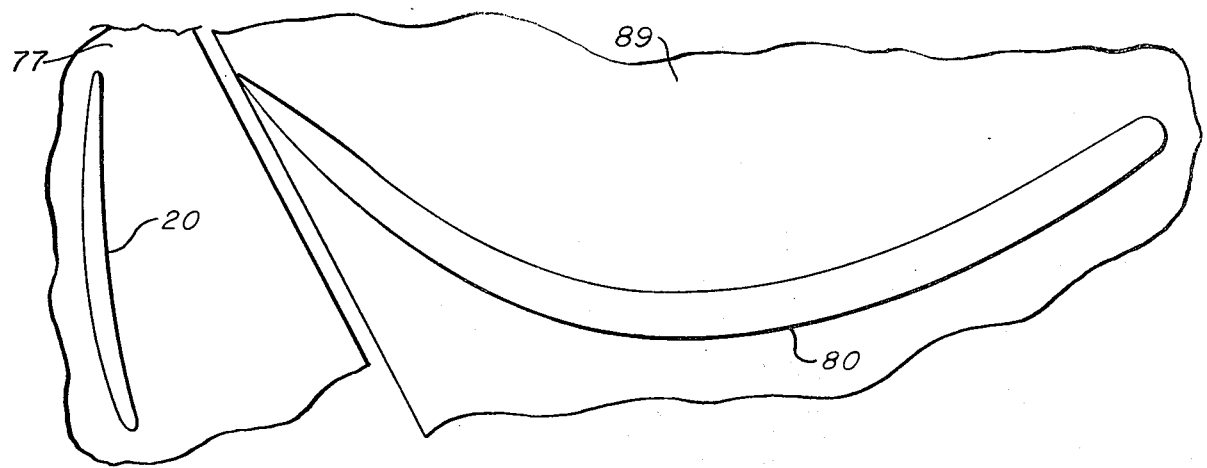
FIG. 8 is a developed drawing of a portion of the apparatus seen in FIG. 7.

Several fixed shroud elements cooperate with the rotatable shroud element 84. These include particularly a generally cylindrical shroud element 93 having an upper conical surface 82 generally of the form of the contour of conical surface 89. The annular shroud element 93 is supported directly from surface 89 by a plurality of stationary stream-directing vanes 80. The vanes 80 act both to support shroud element 93 and also to direct the flow of the pumped hot water. While the vane 80 is illustrated in FIG. 7 as lying generally in the plane of the drawing, the vanes 80 are preferably shaped so as to efficiently convert any rotational component of motion of the pumped hot water into upward translation, thus increasing the hot water high pressure as it ascends. The stator part 93 of the shroud is completed by a throat member 85 of annular construction held in place against shroud element 93 by an array of bolts such as bolt 87. There is thus defined with respect to mouth 88 of the pump, the inner curved surfaces of shroud throat element 85 and of rotatable shroud element 84, and conical surfaces 82 and 89, a passageway by means of which the hot, high pressure water is directed upward at a significantly high velocity for flow within the casing 10. As noted in the foregoing, the plurality of vanes 20 supports rotary shroud element 84 from nose cone 77 for high speed rotation by shaft section 68. While the impeller vanes 20 are shown in the figure as having generally flat plane surfaces, they will preferably take on the hydrodynamic but conventional curved shape shown at 20 in the developed drawing of FIG. 8 for most efficient cooperation with the stationary vanes 80. Flow of hot well water between casing pipe 10 and the stator section 93 of the pump shroud is prevented in any convenient manner, as by use of an annular seal 90 adjacent the pump mouth 88.

Novel features of the invention provide a thrust balance mechanism in the hot water pump configuration. Significant downward axial thrust is encountered with respect to the turbine pump shaft due to the pressure head rise generated by the pump when impelling the hot water upward, this thrust being nearly proportional to total dynamic pressure. Ordinarily with systems in which considerable space is available, large thrust bearings would be employed to carry the large maximum anticipated load. However, such bearings, when used under the present set of hostile circumstances, would be characterized by high levels of power loss and long life and efficiency could certainly not be expected.

The need for finding a mechanism for balancing the high downward axial thrust may be illustrated in a general manner by a specific example. The offered specific example is merely for illustrative purposes, and the values given are not necessarily exact examples of values that would be employed in actual practice.

Consider, for example, that the hot well water pressure at the mouth 88 of the pump throat is about 800 pounds per square inch. In the operating condition of the pump, the pressure in the volume occupied by the inpeller vanes 20 would be boosted, for example, to 1050 p.s.i. At the location at which stator or diffusion vanes 80 meet the annulus 81 between casing 10 and the hollow cylinder portions 70, the pressure might be found to be 1150 p.s.i.

When the turbine and pump system is rotating at its intended operational speed, it generates a heavy downward thrust at shaft portion 58 which is normally opposed by the upward thrust of the 800 p.s.i. hot well water against the equivalent area of the shafts. There remains a considerable net downward force which would otherwise require a large thrust bearing to be absorbed. The pressure balance arrangements of FIG. 7 reduce the undesired net downward thrust and thus permit reduced size of the thrust bearings, which bearings will be discussed relative to FIGS. 9, 12, 13, and 14.

A first aspect of the system for reducing the net downward shaft force involves the configuration of the conical rotor or hub end 77. Rotor hub 77 is arranged with a relatively large axial bore 78 and with a labyrinthal seal 79 lying generally in a horizontal plane in close proximity to cooperating labyrinth seal elements on the generally horizontal end of the stationary conical casting block 75. The elements of seal 79 are concentric with shaft end portion 68 and may consist of many concentric ring-shaped labyrinthal elements as is well known in the art, being shown with only a single stage merely for convenience and clarity in the drawing. Thus, hot water may flow axially with respect to bore 78 and radially in the narrow passageway of labyrinth seal 79.

In the absence of the cooperative presence of bore 78 and labyrinthal seal 79 there would, according to the foregoing example, be a pressure at the top of conical end rotor 77 of about 1,050 p.s.i. or when the effects of the differing areas of the shaft and end rotor 77 are considered, there would be a downward thrust of 6000 pounds. In the configuration shown in FIG. 7, labyrinthal seal 79 allows only a small amount of hot water flow from the 1,050 p.s.i. annulus region 80 radially inward to the top center of rotor hub 77. The high impedance passage way through seal 79 and the low impedance represented by bore 78 cooperate so that the pressure on top hub 77 is essentially 800 p.s.i., rather than the former 1050 p.s.i., reducing the net downward thrust by 920 pounds. It is noted that the area of the labyrinthal seal 79 is at a pressure intermediate between 800 and 1050 p.s.i., for example.

The second aspect of the system for reducing the downward thrust on the shaft is incorporated in the pump shroud system including shroud stator elements 85, 93 and the shroud rotor element 84, which latter is affixed to and rotates with the pump impeller vanes 20. The interface between the shroud rotor section 84 and the stator shroud elements 85 and 93 accommodates a pair of cooperating annular labyrinthal seal elements 91 and 92. Intermediate the distinct seal sections 91, 92 are openings to passageway 83 connecting to the annular passageway just within casing pipe 10 at a junction tapping the 1150 p.s.i. pressure within pipe 10. The labyrinth seal at 91 has a significantly larger diameter than that of labyrinthal seal 92. The elements of the separated labyrinthal seals 91, 92 will, in usual practice, consist of a conventional plurality of cooperating ring-shaped labyrinth elements.

In view of the passageways 83, there will be a differential pressure, say 100 p.s.i., developed across the seal 91. This differential pressure, acting upward on the differential areas of seal 91 and seal 92 establishes an upward thrust, for instance, of 380 pounds, further to help counteract the downward thrust of the operating pump. Thus, the first and second components of the thrust compensation system greatly reduce the forces on the thrust bearing system yet to be discussed and therefore, a relatively smaller diameter thrust bearing may be employed. By use of the two balancing features, reliability of operation is assured along with minimal losses. The axial thrust and balancing forces are both proportional to the pump discharge pressure, so that the balanced condition prevails over a range of speed and flow conditions.

Figure 9:
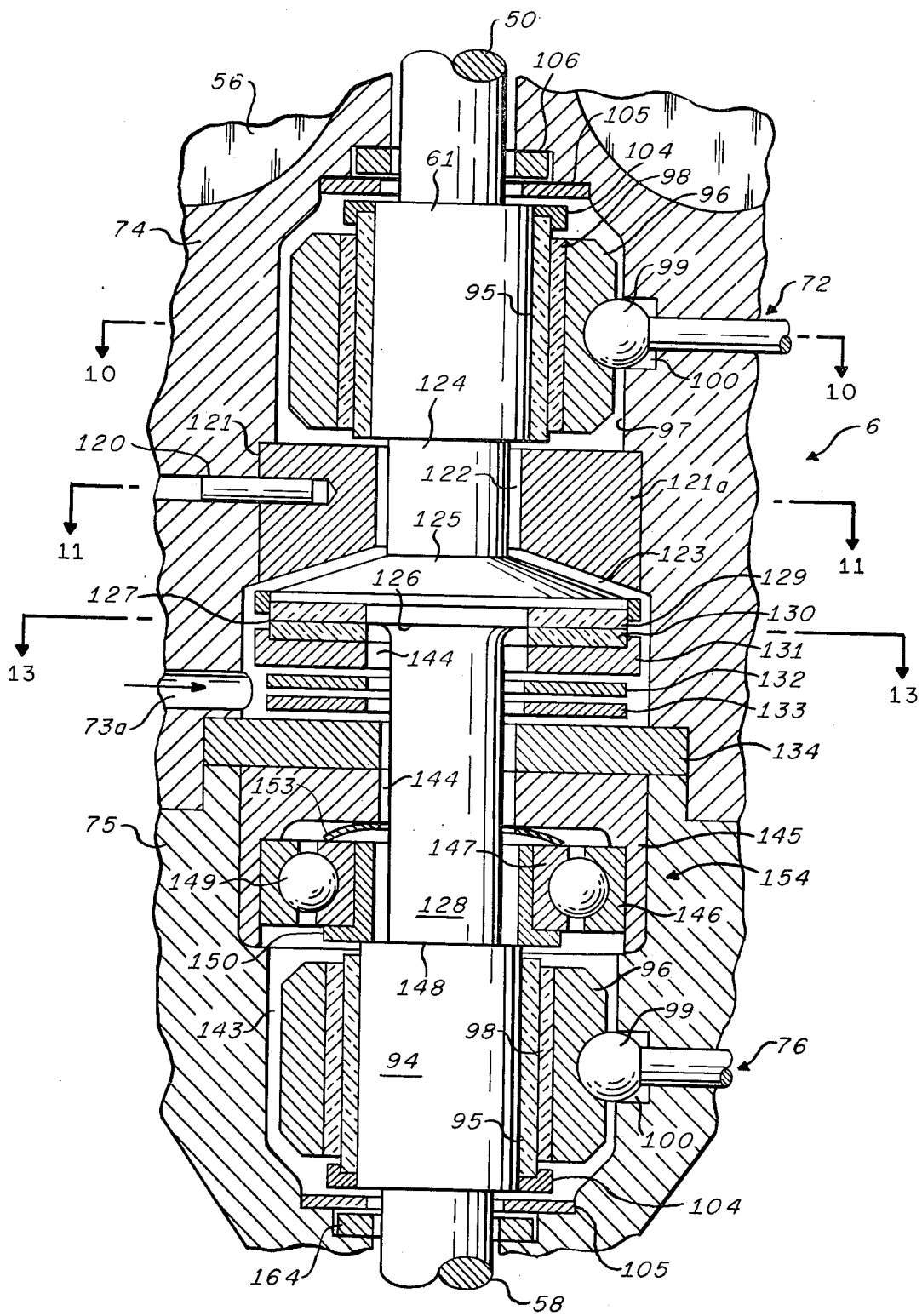
FIG. 9 is a cross section view of a hydrodynamic bearing system for use in the novel of FIG. 3.
Figure 14:
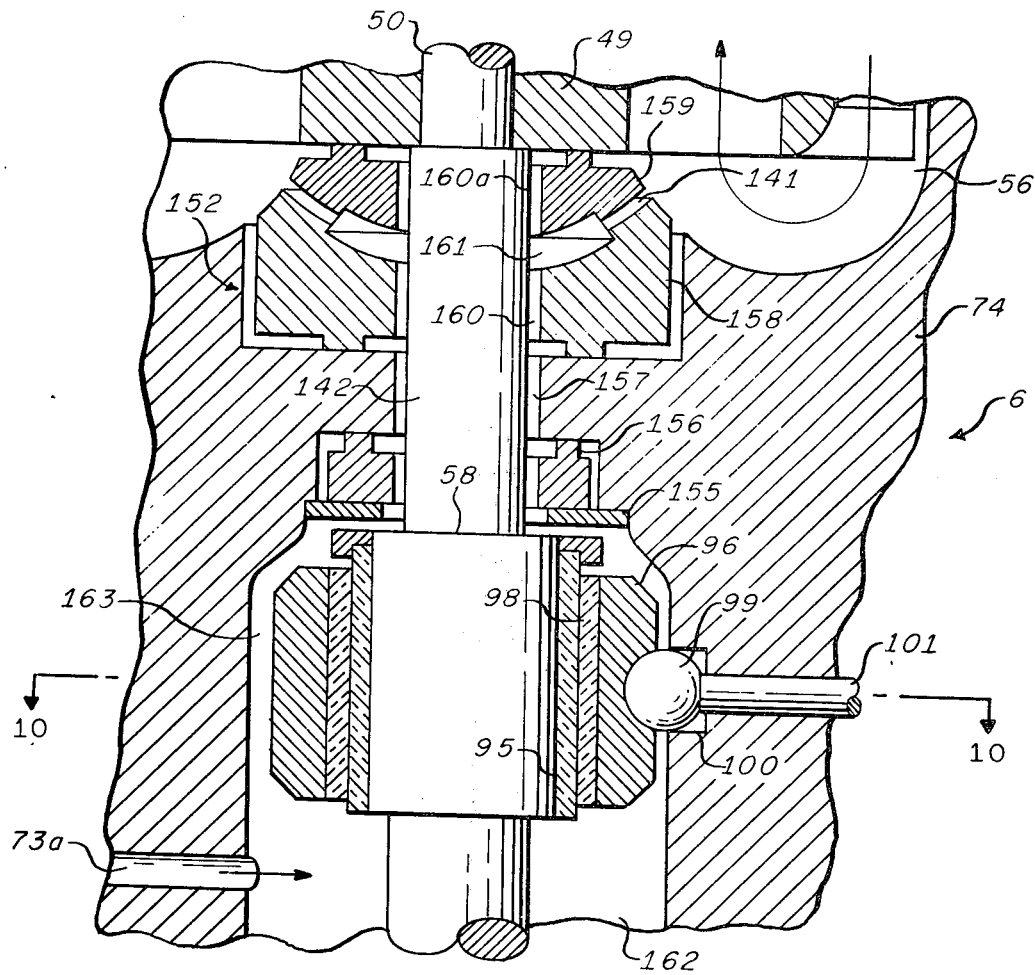
FIG. 14 is a cross section view of a hydrostatic bearing system alternative to that of FIG. 9.

As previously noted, the steam turbine and pump devices of FIGS. 3 and 7 rotate on a shaft whose details are more completely illustrated in FIGS. 9 through 13. Referring now particularly to FIG. 9, the shaft is seen to project through the bearing section 6 between the steam turbine whose rotor is affixed to shaft portion 50 and the water pump whose rotor is attached to shaft portion 58. In general, it is seen that the bearing support structure in bearing section 6 involves four primary elements and that these include a first radial bearing arrangement cooperating with the enlarged shaft portion 61, a thrust bearing section cooperating with the enlarged and tapered section 125, a ball bearing section 154 provided for intermittent use, and a second radial bearing arrangement cooperating with the enlarged shaft portion 94. It will be understood that the turbine-pump shaft bearings are continuously bathed in clean water injected through passage way 73a seen also in FIG. 7 connected to annular manifold 73. The presence of corrosive and contaminated hot well water is prevented by the application of clean water under high pressure to all bearing surfaces. In general, the radial loads due to the shaft are relatively small and are accommodated by tilting pad hydrodynamic bearings associated with shaft portions 61 and 94. The large downward thrust experienced, for instance, during operation of the pump is accommodated by a tilting pad hydrodynamic thrust bearing associated with the tapered enlarged section 125, as will be further discussed in connection with FIG. 12. A hydrostatic thrust bearing may be substituted for the hydrodynamic thrust bearing, as seen in FIG. 14.

It will be understood that the ball bearing arrangement 154 comes into play only when the shaft thrust is upward during zero or low rotational speeds, a condition existing only during or before start up or after shut down. If a hydrostatic bearing similar to that at 125 were instead provided to accept this upward thrust, the rotational speeds existing during this condition would not be sufficient to generate a separating fluid film between the bearing surface, which would consequently suffer damage or destruction. In an extreme case, the steam turbine might not be able to supply the torque needed to start rotation of the system against the frictional effects at the interface of the thrust pad bearings. Accordingly, the ball bearing system's primary function is at the starting of the apparatus and immediately before its rotation completely stops.

It will be noted that clean water flows through the passage 73a into all of the passageways within and around the several bearings, continuously bathing the bearing surfaces with clean cool water. The water flowing into the thrust bearing may flow, for example, between the tilt bearing plates 132 and 133 and will then flow upward through passageways such as 123 and 122 into the radial bearing associated with bearing surface 61. It will lubricate the bearing elements there and will flow upward past the high impedance seal 106, being finally dissipated within the exhaust of the turbine at 56. The annular seal 106 is held by retainer 105 in a confined position and preferably is a seal having very small clearance with respect to the cylindrical surface of shaft portion 50. Such clearance seals are well known in the art and are available in the market, being constructed of tungsten carbide or of aluminum oxide, for example.

The water injected by passage 73a into the thrust bearing also flows downward into passage 144 surrounding shaft portion 128, thus flowing between the races 146, 147 of the ball bearing system 154. Accordingly, the bearing surfaces of the balls and of the races 146, 147 are are continuously lubricated with clean water which flows on downward into the radial bearing associated with shaft portion 94. The bearing surfaces associated with this radial bearing are thus also continuously lubricated with clean water, which is then permitted to flow past the annular high impedance seal 164 and is dissipated by flowing into the hot well water being pumped upward, as described in connection with FIG. 7.

Figure 10:
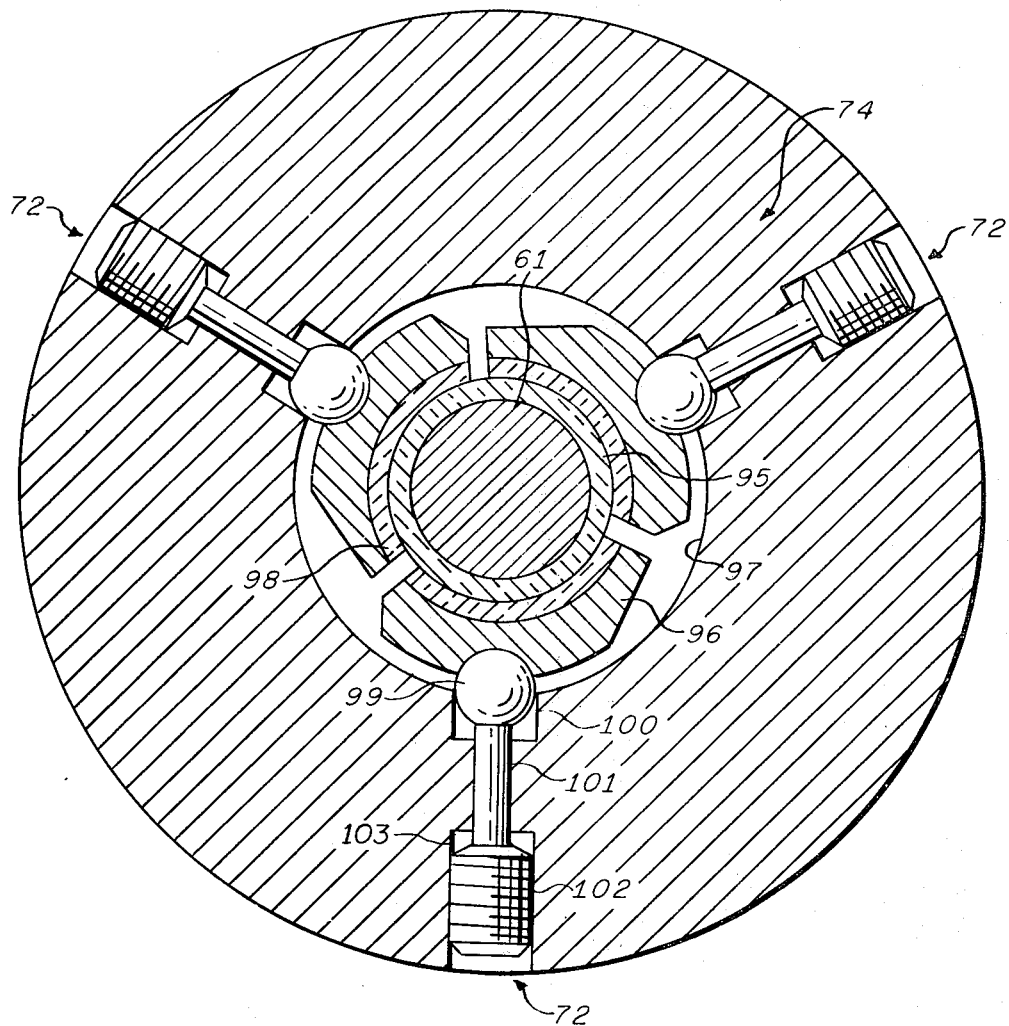
FIG. 10 is a plan view in cross section taken along the line 10—10 of FIG. 9.

Referring now to FIGS. 9 and 10, the structure of the two radial bearings respectively associated with shaft portions 61 and 94 will be discussed. Particularly referring to FIG. 10, it is seen that the radial bearing is of generally conventional tilting pad construction and that the shaft portion 61 is surrounded by a hollow cylinder 95 of aluminum oxide affixed to the shaft. In the usual instance, three tilting pad surfaces cooperate with the aluminum oxide cylinder 95, a typical constuction emplying a fastener 72 including pad positioning shaft 101 which resides in a bore in the body block 74. Pad positioner shaft 101 is located according to the setting of its threaded portion 102, arranged for radial adjustment within body 74. Shaft 101 accommodates, at its opposite end, a hardened steel sphere 99 partially residing at a counterbore 100. Sphere 99 projects into the water filled interior within cylinder wall 97 of body block 74, where it thrusts against a mating depression in the bearing support block 96. To its inner arcuate surface is fixedly attached, as by brazing or other conventional methods, an arcuate sector 98 made of aluminum oxide. The sector 98 and the cylinder 95 have contiguous surfaces between which there resides a very thin lubricating film of clean water. The cylindrical aluminum oxide element 95 may also be affixed to shaft 61 by brazing or by the use of mechanical fixtures such as annular flange 104 seen at the top of FIG. 9. In practice, three or more similar tilting pad radial bearings are employed fully to establish the position of shaft portion 61. It will be evident that the radial bearing at the portion 94 of the shaft in FIG. 9 may be similarly constructed and operated.

Figures 12, 13:
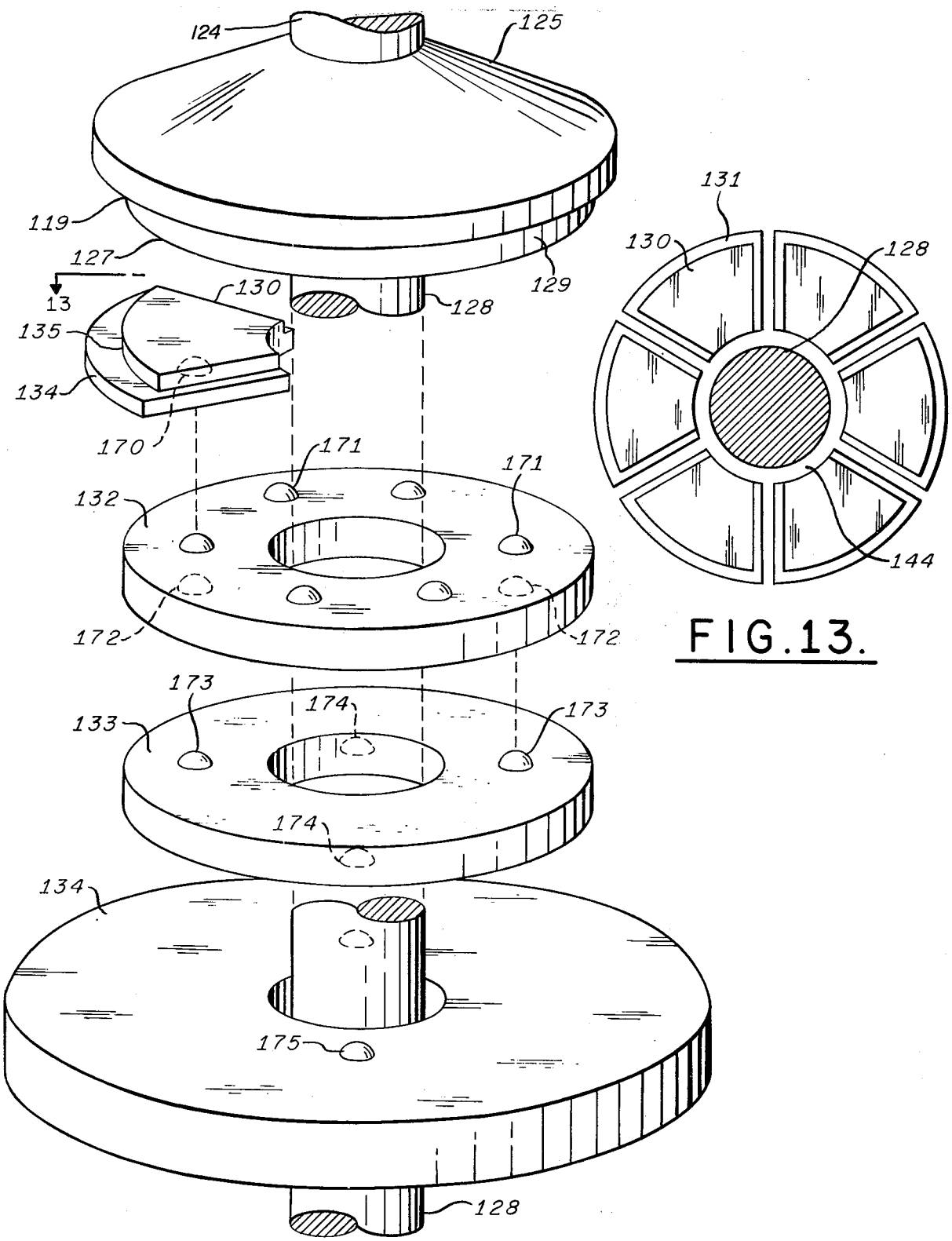
FIG. 12 is an exploded view, partly in cross section, of part of the bearing system of FIG. 9.
FIG. 13 is a plan view taken along the line 13—13 of FIG. 9.

The thrust bearing system is located in FIG. 9 between the two radial bearings associated with shaft portions 61 and 94 and is shown in detail in FIGS. 9, 12 and 13. As seen particularly in FIG. 9, the tilting pad thrust bearing system includes an enlarged and tapered section 125 for supplying a horizontal interfacing surface 126. At the interface surface 126 is fastened with a fluorocarbon viton bonding agent of commerical type or is brazed or otherwise fastened a flat ceramic ring 129 generally concentric with shaft portion 128. The exposed flat annular surface 127 of ceramic ring 129, which may be composed of alumina, forms a thrust bearing surface. As in the instance of the radial bearing, the alumina employed may be of the grade known as COORS 995, which is 99.5 per cent pure aluminum oxide.

As seen most clearly in FIGS. 12 and 13, the flat bearing surface 127 cooperates with a plurality of bearing surfaces, such as the surface of bearing 130, each bearing 130 being associated with a tilt pad thrust bearing element. Each such tilt bearing pad comprises a truncated sector-shaped metal base plate 131 to which the associated sector shaped ceramic bearing 130 may be brazed or otherwise permanently affixed at interface 135. The surface of ceramic bearing 130 is permitted to follow closely to the surface 127 of the annular ceramic ring 129 by a mechanical system yet to be described cooperating with a spherical depression at 170 located centrally in the lower surface of metal base plate 131.

To facilitate tilting of the plural ceramic bearings 130 with respect to the annular support plate 134 as the surface 127 rotates, a pair of tilt plates 132 and 133 is used. Tilt bearing plate 132 is provided with a circular array of hardened spheres 171 providing hemispherical bearing surfaces one each for the respective depressions 170. While ceramic bearing 130 is prevented from rotating about sphere 171 because of the close proxomity of the inner portion of bearing 130 to shaft portion 128, the surface of bearing 130 now has some of the degrees of mechanical constraint needed to permit it to follow surface 127 precisely.

Further undersired constraints are removed by tilt bearing plates 132, 133. For this purpose, the upper tilt bearing plate 132 has attached in its lower surface a pair of diametrically located hemispherical depressions 172, 172. These depressions match the locations of hardened spheres 173, 173 affixed at the upper surface of lower tilt bearing plate 133 so that the upper tilting plate may rotate or tilt slightly about the line between spheres 173, 173. In a similar manner, the lower tilting plate 133 is provided in its lower surface with hemispherical depressions 174, 174. Depressions 174, 174 are spaced along a diameter at right angles to the line between depressions 172, 172. Thus, the former cooperate with hardened spheres 175, 175 (one of which is not seen in FIG. 12) affixed in the upper surface of support plate 134. As seen in FIG. 9, the support plate 134 is clamped in fixed relation between the body block 74 and the conical casting block 75. Further, it is seen that elements 132, 133, and 134 are provided with central aperatures through which the shaft projects for rotation and through which clean bearing lubricating water passes. In the manner, the tilt bearing plates 132, 133 act in a limited range as elements of a gimbal system for permitting each bearing surface of the several ceramic bearings 130 seen in FIG. 13 to follow the flat annular surface of ceramic ring 129 with such precision that the separation between the bearing surfaces is maintained precisely by the supporting clean water film.

Figure 11:
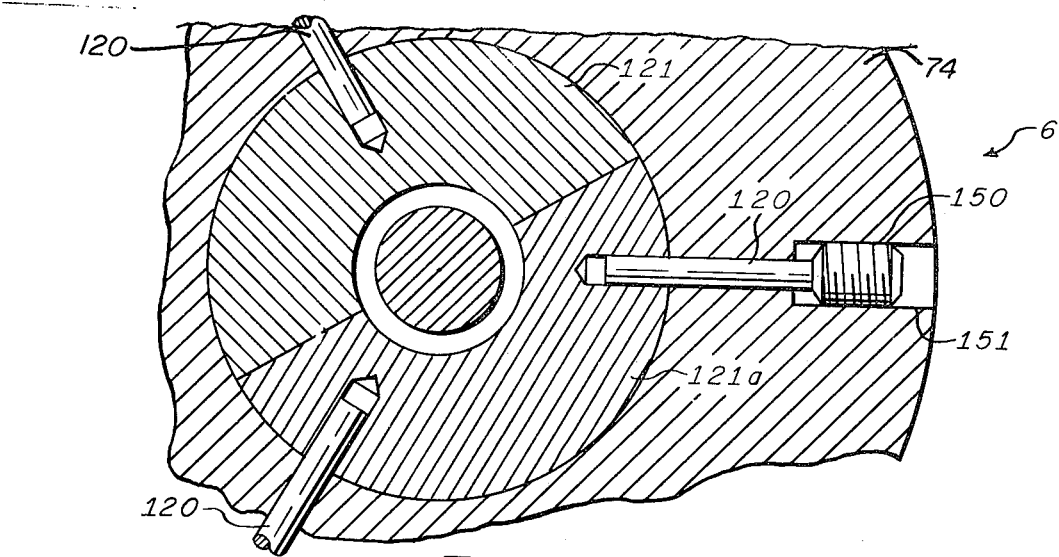
FIG. 11 is a plan view in cross section taken along the line 11—11 of FIG. 9.

FIGS. 9 and 11 illustrates an arrangement of parts made necessary because of tapered portion 125 to facilitate assembly of elements of the invention. An annular element is formed in halves 121, 121a and is held in position by pins or other fasteners 120 threaded as at 150 into a mating threaded bore 151 in body casting block 74, the elements 121, 121a simply largely filling a a space within body casting block 74 in which undesirable turbulence might occur in the clean lubricating water. Being generally conformal to the shape of its surrounding walls, the passages 122, 123 are more narrowly defined by the annulus 121, 121a.

In the starting condition of the pump, there is a several hundred pound upward thrust against the main shaft because of the high pressure of the hot well water. The effect of the reverse thrust present in the starting or stopping situation must be reduced or removed, even though the starting cycle may be, for instance, only a minute or so in duration. For this purpose, the ball bearing system 154 of FIG. 9 is interposed, by way of example, between the thrust bearing at the tapered shaft portion 125 and the radial bearing at shaft portion 94. In FIG. 9, the ball bearing system 154 is shown in its actual operating situation, as, for example, during start up or shut down of the entire apparatus. In such a situation, the hot well water pressure forces the shaft upward, so that the upper surface 148 of the enlarged shaft portion 94 is forced against a surface of retainer 150. Its outer race 146 is affixed to outer annular retainer 145, while its inner race 147 is integral with the annular flange-like retainer 150. Thus, the balls 149 of ball bearing system 154 act with races 146, 147 to absorb the transient upward thrust and generally to position the shaft. When the entire apparatus is operating, the shaft is in a downward position and retainer 150 is not rotating, there being clearance between it and surface 148.

Normally, the start cycle is a small fraction of the expected life of ball bearing stystem 154 under the circumstances. As rotational speed of the apparatus increases, the downward thrust of the pump will exceed the hot well water upward thrust, and the sence of the thrust on the shaft reverses. It will be understood by those skilled in the art that sufficient axial clearances are provided throughout the invention that the shaft, together with its attached turbine and pump rotors, will then move downward, disengaging contact between the end surface 148 of shaft portion 94 and retainer 150, disengaging the ball bearing system 154. Thus, under normal operating conditions, bearing 154 is unloaded and the friction ring 153 acts to prevent incidental rotation of inner race 147 and ring 150.

As noted in the foregoing, a hydrostatic thrust bearing as shown in FIG. 14 may replace and play the role of the hydrodynamic thrust bearing illustrated in FIG. 9. Such a hydrostatic thrust bearing may be used cooperatively with a pair of radial pad bearings of the type shown in FIG. 9, only one such bearing being shown at shaft portion 58 in FIG. 14.

The hydrostatic bearing of FIG. 14 is also lubricated by clean water flowing through passage 73a and consists of rotor and stator parts located in a generally cylindrical cavity 152. The stator 158 surrounds shaft portion 142 with a small clearance passage at 160 of width, for example, 0.002 inches, and in pressure balanced against the non-rotating body casting block 74. Although not actually prevented from rotating, the friction between bearing stator 158 and block 74 is sufficient to prevent stator 158 from turning with shaft portion 142. The bearing rotor 159, which is pressure balanced against the hub 49 of the steam turbine wheel, generally rotates with hub 49. Both the stator 158 and rotor 159 are permitted to move axially relative to shaft portion 142 by slight amounts. Thus, stator 158 and rotor 159 can move axially relative to each other by amounts sufficient to bring their spherical bearing surfaces into natural alignment for supporting a lubricating water film at 141, water for the film being supplied from passageway 73a through annular passages 162, 163, 157, 160, and 161. The hydrostatic pressure unbalance caused by any non-alignment of bearing stator 158 and bearing rotor 159 forces the parts into alignment. The passage 157 includes an annular pressure-dropping seal 156 held in position by retainer 155.

In operation, the high pressure lubricating water flows past pressure dropping seal 156 and across the spherical bearing surface, forming film 141, and is conveniently disposed of in the low pressure steam turbine exhaust passage region 56. If the pressure of the lubricating water approaching seal 156 is, for example 1400 p.s.i., part of this will appear as a pressure drop across seal 156, with most of the remainder of the drop appearing across the bearing interface within film 141. The bearing 158, 159 is designed so that the average effective pressure in the spherical film 141 acting to separate the components 158, 159 generates an upward force substantially matching the downward thrust of the pump at the chosen operating bearing clearance of film 141 (say, 0.0005 inches). This film thickness changes to match changing loading conditions, increasing slightly with a decreased load and decreasing slightly with an increased load.

Such action obtains because the seal 156 provides a substantially constant impedance, the pressure drop across it being proportional to flow rate, and the bearing impedance changes as the film 141 thickness changes, the pressure drop at the spherical bearing at constant flow rate being inversely proportional to the cube of the film 141 thickness. Accordingly, if bearing 158, 159 is operating stably in a steady state condition and the load is increased:

a. the increased load becomes greater than the hydrostatic force generated in the thrust bearing and the bearing clearance begins to decrease,
b. as the clearance decreases, the thrust bearing impedance increases and water flow through the seal 156 accordingly decreases,
c. with decreased water flow, the pressure drop across seal 156 decreases and the drop across the bearing increases, and
d. the bearing continues to close down until the pressure across the bearing rises to the point that it supports the increased load.

If the load diminishes, the reverse sequence is experienced, the bearing reaching equilibrium with an increased clearance and increased lubricating water flow.

Figure 15:
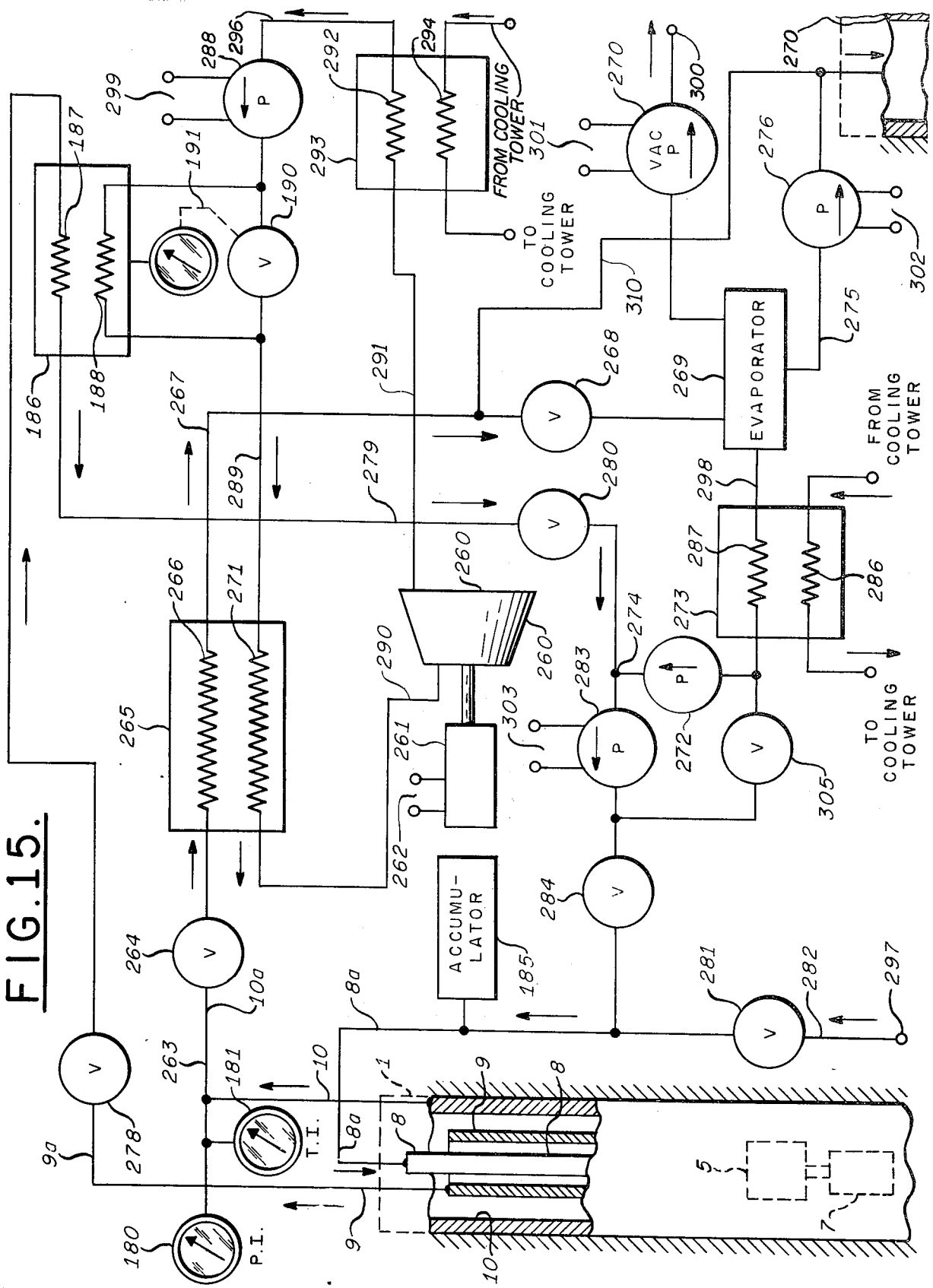
FIG. 15 is a diagrammatic representation of the apparatus at the earth's surface cooperating with the deep well apparatus of FIG. 1.

In discussing the apparatus of FIG. 15, it will further be understood that the objective of the deep well apparatus of FIGS. 1 through 14 is to serve as part of a system to generate large quantities of electric power at the earth's surface using generally conventional steam turbines and electrical generators preferably located at ground level, such as turbine 260 and the electrical alternator 261 of FIG. 15, at power output terminals 262. For this purpose, the hot water pumped to the earth's surface is fed by pipe 10 and its extension (pipe 10a) through the normally open valve 264 to element 266 of the conventional boiler-heat exchanger device 265. Device 265 is of conventional closed tank-like nature and is designed to exchange heat between the heat exchanger elements 266 and 271 contained therein. The elements 266 and 271 may take the form of lineal or coiled pipes exchanging heat energy by direct thermal conduction through their metal walls or through a suitable interposed fluid in the well known manner. Heat from the hot water of pipe 10a is the major source of heat for supply to device 265. A small portion of the hot water, having been relatively dropped in temperature within boiler-heat exchanger 265, is then fed via pipe 267 through the normally open valve 268 to the conventional evaporator 269. Valve 268 may be a throttle valve adjusted for the purpose of dropping the pressure of the fluid flowing through it so that the fluid will readily flash at low temperatures when supplied to evaporator 269. Evaporator 269 is of conventional nature and is supplied in the usual manner with a conventional vacuum pump 270 which serves to remove the non-condensable gasses.

Evaporator 269 generates clean steam which is condensed by the conventional condenser 273 and is supplied by water pump 272 at junction 274 for augmenting the clean water supply. The major portion of the water originally flowing upward in the well casing pipe 10 is returned by pipe 275 to the earth well formed by pipe 277. Thus, a major portion of dissolved mineral salts pumped to the surface in solution in the hot water in pipe 10 is returned into the ground. The well formed by pipe 277 may be reasonably remote from the well of the thermal well system and may serve more than one such system. It may pass the liquid into an earth stratum differing from the original hot well water source or into the same strata. An accumulator or variable capacity storage tank 185 is added in a branch line 8a connected to clean water return 8 for purposes yet to be described.

A second source of energy is supplied to boiler-heat exchanger device 186 and is the steam exhausted from the deep well turbine 5 via pipe 9. This steam is permitted to flow through pipe 9a and the normally open valve 278 to the heat exchanger element 187 of boiler-heat exchanger device 186. Element 187 is arranged so that the steam therein is exposed to thermal interchange at the coolest end of device 186 (adjacent the cool clean water input to heat exchanger element 188). Accordingly, the exhaust steam from pipe 9 and 9a is condensed within heat exchanger 186. The water thus consensed is supplied through pipe 279 and the normally open valve 280 to the aforementioned junction 274. The water from pipe 279 and that from condenser 273 arrive at junction 274 in relatively pure state and may therefore be supplied directly to the cold water input pipe 8 of the deep well apparatus. With valve 281 in branch line 282 closed, the water at junction 274 is fed by a conventional feed pump 283 through the normally open valve 284 and pipe 8a into pipe 8. Replenishment water may be supplied by opening the valve 281 from any available source coupled at terminal 297. It will further be understood that condenser 273 may be water cooled, as by supply of cool water from a cooling tower (not shown) to heat exchanger element 286 in heat exchanger 273. Alternatively, element 273 may be cooled in many locations simply by forced air flow.

The feed pump 283 is transformed, in effect, into a variable flow pump by the use of adjustable valve 305 placed in shunt with the pump or by other well known means. Accordingly, the amount of clean water passing through the clean water return pipe 8a may then be adjusted to an optimum value manually by adjustment of valves 284 and 305 from a previously prepared table upon visual inspection of the readings of indicators 180 and 181, respectively showing the pressure and temperature of the pumped hot well water within pipe 10. A servo system may be employed to perform the adjustment, if desired.

During normal turbine-pump operation, the feed pump 283 delivers clean water to the downward flow feed pipe 8 at a pressure that is sufficient, considering the gravity head, that the clean lubricating water arrives at the input to the subterranean steam generator 18 at a pressure several hundred pounds per square inch above the pressure of the hot well water. The accumulator 185 than operates to smooth any pressure fluctuations which might otherwise occur due to pump 283 at the input to steam generator 18.

Figure 16:
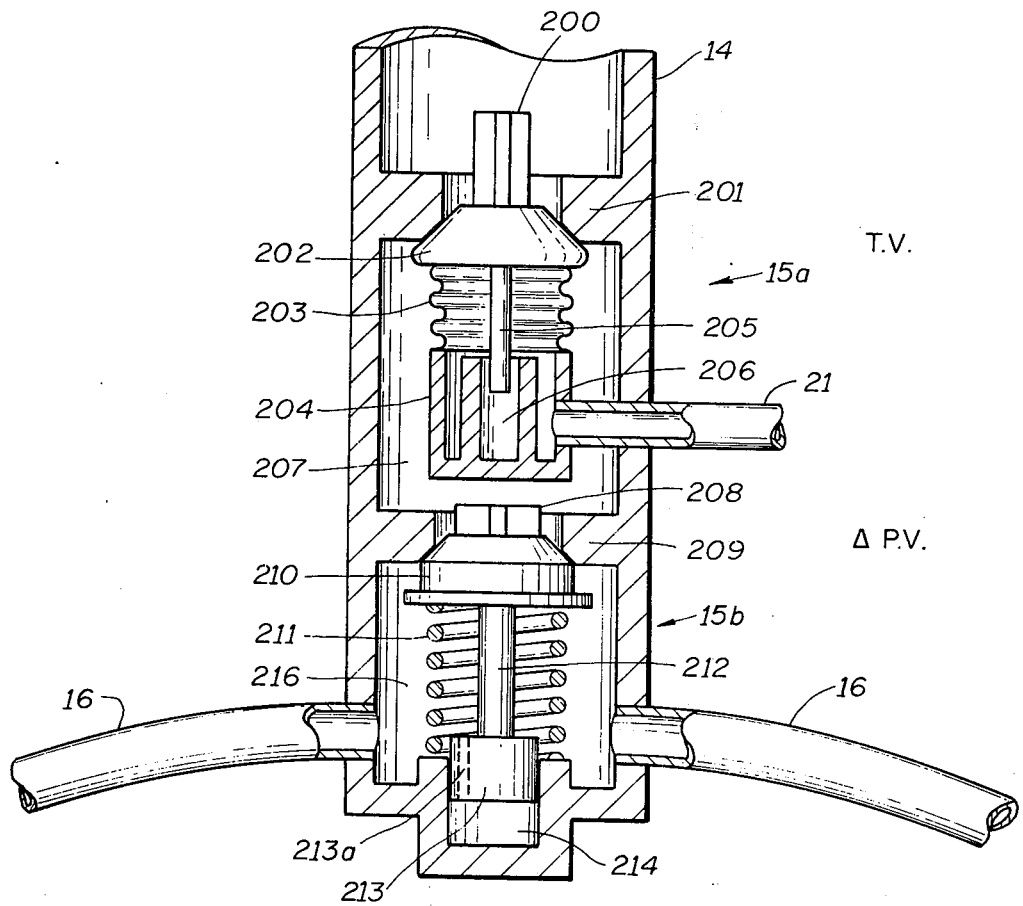
FIG. 16 is an elevation view in partial cross section of the regulator devices shown in FIGS. 1 and 2.

Threshold valve 15a of FIG. 2, shown also in greater detail in FIG. 16, is set to open at a fixed differential pressure (say, 100 p.s.i.) above the hot well water pressure and is thus normally wide open. The differential pressure valve 15b, also seen in FIGS. 2 and 16, preset so as to maintain automatically a constant differential between the pressure of the feed water and that of the water entering steam generator 18. The steam generator input feed water pressure must be less than the saturation pressure of that water at well temperature in order that it may vaporize within the steam generator 18. Under proper operating conditions, the steam generator input water pressure determines the pressure within steam generator 18. Further, the steam pressure determines the rate of mass flow through turbine nozzles 59.

Thus, according to the invention, the feed water pressure is controlled at the surfaces by varying the feed pump 283 output pressure into pipes 8a and 8. Only one simple element is involved in the control operation that must be located near the deep well apparatus. As will be seen, the steam exhaust pressure at turbine 5 is controlled from the surface by adjusting its condensing temperature. Such a control permits control of the dryness of the steam within turbine 5.

The turbine-pump system may be down by lowering the output pressure of clean water feed pump 283 to the point at which threshold valve 15a closes, but still at a pressure sufficient that the turbine bearings are lubricated while the stored energy in steam generator 18 is dissipated and the rotation of the turbine ceases. This intermediate pressure is still above the pressure of the hot well water may be maintained continuously while the rotary system is stopped so as completely to exclude the hot contaminated well water from the interior of the turbine-pump system and particularly from the interior of all bearings.

The valve 284 may include a check valve mechanism as well as conventional flow rate adjusting parts. If the feed pump 283 fails, such a back flow check valve will shut, preventing flow loss through feed pump 283, and the pressure within accumulator 185 will quickly decay to the level at which threshold valve 15a closes. Thus, the turbine 5 may safely decelerate and stop. Accumulator 185, however, will continue to supply the small clean water flow required by the bearings of the pump-turbine system for lubrication of all bearings during the stopping sequence.

Referring now to FIG. 16, details of the threshold valve 15a and the differential pressure valve 15b of the regulator 15 are presented. As previously noted, the pressure regulator system may comprise conventional elements. These elements may be enclosed in a unitary extension of the clean water input pipe 14, the extension being coupled at its lower output to the distribution pipes 16 previously discussed with respect to FIG. 2. Also supplied is a tube 21 for coupling the pressure of the rising hot well water to the threshold valve 15a.

It is seen that the threshold valve 15a utilizes a valve armature element 202 which may be seat in an annular conical seat in partition 201 with the cooperative guidance provided by guides 200 and a steam 205 free to move vertically within a cavity 206 provided by damping purposes, if desired. The armature 202 of the valve 15a is further supported by a spring bellows 203, sealed to the base of the armature 202 and to the top of the cup element 204 surrounding damper element 206. Tube 21 provides support for cup 204 and an input to the cavity formed within bellows 203, cup 204, and damper cavity so that a pressure is maintained therein corresponding to that of the rising hot well water.

The pressure above armature element 202, when threshold valve 15a is opened, is communicated through cavity 207 to the top of a second valve armature 210 found within differential pressure valve 15b. The armature 210 is arranged to seat against a conical surface in the partition 209, being guided with respect to the aperture in partition 209 by guides 208, stem 212, and piston 213. Piston 213 may operate as a damper element by employment of a suitable damping fluid in cavity 214 along with a small bore 213a communicating between opposite surfaces of piston 213. Operation of the differential pressure valve 15b, like that of the threshold valve 15a depends upon use of an appropriate spring constant for the spring 211 which tends to urge the valve armature 210 into seated relation with the conical seat of partition 209. In view of the generally conventional nature of the elements of this regulatory system 15 and considering its function in operation within the system as a whole as described in the foregoing material, its operation will be fully apparent to those skilled in the art.

The major elements for supply of heat into boiler-heat exchanger device 265 have been described. This heat is removed and used in substantially conventional manner to operate the surface-located vapor turbine 260. For this purpose, liquid is supplied by a conventional feed pump 288 via pipe 289 to the heat exchanger element 271 of boiler-heat exchanger 265. Flow of the liquid is counter to the direction of flow of heat into device 265 in element 266. The liquid evaporates and consequently generates high temperature vapor that is coupled via pipe 290 to the input stage of turbine 260. After performing useful work therein, the turbine exhaust vapor fed by pipe 291 flows to a conventional condenser device 293 having heat exchanger elements 292 and 294 and then flows again as a liquid via pipe 196 to the feed pump 288. Condenser 292 may be cooled by flow of water from a cooling tower (not shown) through heat exchanger element 294. The exchanger 293 may alternatively be air cooled in the conventional manner. A fluid such as water may be used for the generation of high temperature vapor within boiler-heat exchanger 265 and its associated surface-located loop or certain organic fluids affording best use in Rankine cycle operation may alternatively be employed.

Referring again to FIG. 15, there is located between feed pump 288 and condenser element 271 a variable valve 190 in shunt with heat exchanger element 188. The valve 190 may be adjusted manually after observation of temperature indicator 189 which provides a reading in response to the temperature of the turbine exhaust steam in pipe 9a. An automatic servo link indicated by the dotted line 191 may alternatively be employed. By-pass valve 190 is continuously adjusted according to the temperature of the steam in pipe 9a. Thus, the pressure in pipe 9a (the subterranean turbine 5 back pressure) is adjusted so as to control the dryness of the steam in turbine 5. This desired control is readily exercised at the surface simply by adjusting the temperature of condenser 186.

The general operation of the invention will be apparent from the foregoing description. It is seen that the geothermal energy deep well system consists of a deeply submerged super-heated steam generation section 4, a turbine section 5 driven by the super-heated steam, and a hot water pumping section 7 all located in a hot water source region where there is present large quantities of hot water which may also include relatively large quantities of dissolved materials. Clean water, formed by condensing the clean steam at the surface, is supplied to the steam generation section 4 for driving the turbine at 5 and is also reliably supplied to bearings in the turbine and pump sections thereof. The hot water pump section 7 serves to increase the pressure level of the hot water so that it reaches the surface of the earth still well above its saturation pressure.

The pressure of the well water entering the hot water pump is great enough to prevent cavitation damage to the pump and any consequent performance loss in the pump. In general, it is arranged that actual pressures in the hot water are maintained above the flash point by a wide safety margin at all points in the hot water flow system within the well. This is one of the several features of particular importance to the success of the invention, since the hot water can not flash into steam when held at all times and locations above its flash pressure. Flashing of the hot water into steam is to be prevented, since it is likely to be disruptive if not actually destructive of equipment and at least will result in the deposition of large amounts of mineral scale in the general location of the flash event. The system at the surface of the earth readily extracts heat from the extremely hot water for the generation of electrical power or for other useful purposes. What energy remains in the steam used to drive the deep well turbine at section 5 is also returned to earth's surface for recovery in the surface-located system.

While the invention has been described in its preferred embodiments, it is to be understood that the words which have been used are words of description rather than of limitation and that changes within the purview of the appended claims may be made without

I claim:

1. In geothermal deep well pump apparatus located at a subterranean source of geothermal will fluid and of the kind including geothermal energy exchange means for providing a working fluid and pump means for puming said geothermal well fluid always in liquid state for flow in cooperative energy exchange relation with respect to said geothermal energy exchange means toward the earth's surface:

rotor means coupled by shaft means for driving said pump means, annular conduit means for directing flow of said working fluid from said geothermal energy exchange means generally in a first direction in energy exchanging flow with respect to said rotor means for driving said rotor means, annular working fluid redirecting conduit means at said rotor means opposite said annular conduit means for generally reversing the direction of flow of said working fluid, said rotor means having rotor passage way means about said shaft means for permitting passage of said redirected working fluid therethrough in a second direction generally opposite said first direction after said working fluid has yielded energy to said rotor means.

2. Apparatus as described in claim 1 wherein said rotor means includes shaft mounted hub means and rim means supported in spaced mutual relation by spoke means for forming said rotor passage way means between said spoke means about said shaft means.

3. Apparatus as described in claim 2 wherein said spoke means have a generally planar wide surface titled with respect to the major plane of said rotor means.

4. Apparatus as described in claim 3 wherein said tilted spoke means have an angle of incidence with respect to said general direction of flow of said redirected working fluid substatially such that energy is neither added to nor subtracted therefrom at the operating speed of said rotor means.

5. Apparatus as described in claim 2 wherein a plurality of energy extracting turbine blade means is disposed on said rim means for energy exchanging action with said working fluid at said annular conduit means.

6. Apparatus as described in claim 5 wherein said annular conduit means includes working fluid directing nozzle means.

7. Apparatus as described in claim 5 further including stator means supporting bearing means for rotation therein of said shaft means, said stator means cooperatively forming a wall of said annular conduit means and of said working fluid redirecting conduit means.

8. Apparatus as described in claim 7 including plural redirecting stator turbine blade means disposed in annular array on said wall of said stator means adjacent said plurality of energy extracting turbine blade means.

9. Apparatus as described in claim 1 further including a plurality of radially directed vane means within said annular working fluid redirecting conduit means for diminishing rotational flow therein of said working fluid.

10. Apparatus as described in claim 9 wherein said annular working fluid redirecting conduit means is generally hemi-toroidal in shape modified for permitting expansion of said redirected working fluid as it flows toward said rotor passage way means.

11. Apparatus as described in claim 1 wherein said redirected working fluid, having passed through said rotor passage way means, flows through exhaust conduit means having a wall in common with said annular conduit means.

12. Apparatus as described in claim 11 further including a plurality of radially directed vane means within said exhaust conduit means for diminishing rotational flow therein of said working fluid.

13. Apparatus as described in claim 11 additionally including geothermal fluid conduit means disposed substantially symmetrically about said annular conduit means and having a wall in common therewith for permitting substantially unimpeded flow of said geothermal fluid from said pump means.

* * * * *